(12) United States Patent
Miller et al.

(10) Patent No.: US 7,066,597 B2
(45) Date of Patent: Jun. 27, 2006

(54) BALANCED PROGRESSIVE LENS

(75) Inventors: Anthony Dennis Miller, Bellevue Heights (AU); Saulius Raymond Varnas, Brighton (AU); Michael Alan Morris, Santa Rosa, CA (US); Warren Scott Fisher, Flagstaff Hill (AU); Angela Moira Nolan, Brighton (AU); Kym Ansley Stockman, Happy Valley (AU)

(73) Assignee: Sola International Holdings Limited, Lonsdale (AU)

( * ) Notice: Subject to any disclaimer, the term of this patent is extended or adjusted under 35 U.S.C. 154(b) by 0 days.

(21) Appl. No.: 10/497,108

(22) PCT Filed: Dec. 4, 2002

(86) PCT No.: PCT/AU02/01641

§ 371 (c)(1), (2), (4) Date: Nov. 29, 2004

(87) PCT Pub. No.: WO03/048841

PCT Pub. Date: Jun. 12, 2003

(65) Prior Publication Data

US 2005/0083482 A1   Apr. 21, 2005

(30) Foreign Application Priority Data

Dec. 5, 2001  (AU) .................................. PR 9324

(51) Int. Cl.
*G02C 7/06* (2006.01)

(52) U.S. Cl. ........................................ 351/169; 351/177
(58) Field of Classification Search ................. 351/169
See application file for complete search history.

(56) References Cited

U.S. PATENT DOCUMENTS

| | | | |
|---|---|---|---|
| 3,785,724 | A | 1/1974 | Cretin-Maitenaz |
| 4,426,139 | A | 1/1984 | Van Ligten et al. |
| 4,577,942 | A | 3/1986 | Frieder et al. |
| 4,606,622 | A | 8/1986 | Fuëter et al. |
| 4,838,675 | A | 6/1989 | Barkan et al. |
| 4,934,808 | A | 6/1990 | Kitani |
| 5,771,089 | A | 6/1998 | Barth |
| 5,861,935 | A | 1/1999 | Morris et al. |
| 6,102,544 | A | 8/2000 | Baudart et al. |
| 6,142,624 | A | 11/2000 | Morris et al. |
| 6,155,681 | A | 12/2000 | Kris et al. |
| 6,260,967 | B1 | 7/2001 | Edwards et al. |

(Continued)

FOREIGN PATENT DOCUMENTS

EP   0668524 A2   8/1995

(Continued)

*Primary Examiner*—Jordan M. Schwartz
(74) *Attorney, Agent, or Firm*—Buchanan Ingersoll PC

(57) ABSTRACT

A progressive ophthalmic lens element including a lens surface having an upper viewing zone having a surface power to achieve a refracting power corresponding to distance vision, a lower viewing zone having a different surface power than the upper viewing zone to achieve a refracting power corresponding to near vision; and an intermediate zone extending across the lens element having a surface power varying from that of the upper viewing zone to that of the lower viewing zone one or more of the upper, intermediate and lower viewing zones being designed optically to reduce or minimise a selected measure of blur for the corresponding range of object distances; and at least a portion of the peripheral region of the surface of the ophthalmic lens element being designed to reduce or minimise one or more surface characteristics known to correlate with the sensation of swim.

41 Claims, 10 Drawing Sheets

1.50 D Add 2.00 D Add 2.50 D Add

U.S. PATENT DOCUMENTS

| | | |
|---|---|---|
| 6,305,800 B1 | 10/2001 | Miller et al. |
| 6,343,861 B1 | 2/2002 | Kris et al. |
| 6,382,789 B1 | 5/2002 | Baudart et al. |
| 6,440,335 B1 | 8/2002 | Kingsbury et al. |
| 6,454,408 B1 | 9/2002 | Morris et al. |
| 6,652,096 B1 | 11/2003 | Morris et al. |
| 6,682,193 B1 | 1/2004 | Morris et al. |
| 6,793,340 B1 * | 9/2004 | Morris et al. ............... 351/169 |
| 2003/0107707 A1 * | 6/2003 | Fisher et al. ................ 351/177 |

FOREIGN PATENT DOCUMENTS

| | | |
|---|---|---|
| WO | 94/04344 | 3/1994 |
| WO | WO 94/04344 | 3/1994 |
| WO | 01/25837 A1 | 4/2001 |

* cited by examiner 1.50 D Add  2.00 D Add  2.50 D Add 1.50 D Add  2.00 D Add  2.50 D Add 1.50 D Add  2.00 D Add  2.50 D Add

BALANCED PROGRESSIVE LENS

This application claims priority to PCT Application No. PCT/AU02/01641, filed on Dec. 4, 2002, and published under International Publication No. WO 03/048841, on Jun. 12, 2003, which claims priority to Australian Patent No. PR 9324, filed Dec. 5, 2001.

The present invention relates to a progressive ophthalmic lens and in particular to a general purpose progressive ophthalmic lens exhibiting an individually targeted optimisation in different lens surface areas for foveal and peripheral vision, and to a process for producing such lenses.

BACKGROUND

Numerous progressive lenses are known in the prior art. Progressive lenses have heretofore been designed on the basis that they have distance, near and intermediate viewing zones. The intermediate zone joins the near and distance zones in a cosmetically acceptable way, in the sense that no discontinuities in the lens should be visible to people observing the lens of the wearer. The design of the intermediate zone is based on a line called the "eye path" along which the optical power of the lens increases more or less uniformly.

Prior art progressive lenses attempt to optimise the whole lens surface using the global optimisation criteria, be they surface or ray-traced (optical) quantities that are being optimised. This approach does not take into account that the progressive lens has two functionally distinct areas: those for the foveal vision at far, intermediate and near object distances, and others for the peripheral vision only. Also, the question of the appropriate balance between the sizes of zones intended for clear distance and near vision respectively has, not been addressed to date.

Clinical trials and practitioner surveys suggest that most progressive lenses on the market today exhibit a substantial bias towards the distance vision performance at the expense of near vision. In addition, little attention has been paid to the optics of the zone for intermediate vision.

In addition, the question of optical binocularity has been addressed in prior art progressive lenses only with respect to near vision and dealt with primarily with the choice of the inset of the near reference point (NRP).

SUMMARY

It would be a significant advance in the art if a progressive ophthalmic lens could be designed such that it is optimised for foveal vision, i.e., minimising a selected measure of optical blur, in the distance, intermediate and near zones, while the peripheral regions of the lens are optimised to reduce the discomfort and swim originating in the peripheral vision provided by the progressive lens. It would be a further significant advance in the art if the general purpose progressive lens was designed with the zone sizes balanced to give the typical wearer equal satisfaction with the distance vision performance and the near vision performance.

It would be a still further advance in the art if the progressive lens design ensured that good optical binocularity is maintained when moving from near to intermediate viewing tasks.

Semi-finished progressive lenses are typically designed in a series of base curves and addition powers to fulfil the requirements for a wide range of prescriptions. This raises the issue of the variability of the lens performance with the wearer prescription. Given the wide range of prescriptions that exist in the population, it would be virtually impossible to equalise the lens performance for all of them in all the significant lens parameters. This is particularly the case for the lens performance variations with the addition power. Few prior art progressive lens series attempt to deal with this issue. Previous attempts to solve this problem have failed to identify the most important lens characteristics that determine wearer's perception of the lens overall performance.

It would be a still further significant advance in the art if the progressive lens performance variation with prescription was reduced in at least some of the most important performance characteristics.

Accordingly, it is an object of the present invention to overcome, or at least alleviate, one or more of the difficulties and deficiencies related to the prior art. These and other objects and features of the present invention will be clear from the following disclosure.

By the term "corridor" as used herein, we mean an area of the intermediate zone of varying power bounded by nasal and temporal contours of tolerable aberration for foveal vision.

The corridor has a "corridor length" (L), as used herein which corresponds to the length of the segment of the visual fixation locus which extends from the vertical height of the fitting cross (FC) to the vertical height of the near vision measurement point.

By the term "swim", as used herein we mean wearer perception of the unnatural movement of objects within the visual field during dynamic visual tasks, which may lead to a sense of unsteadiness, dizziness or nausea.

By the term "RMS power error" or "RMS blur", as used herein we mean $$E_{RMS} = \left( \frac{\varepsilon_{11}^2 + 2\varepsilon_{12}^2 + \varepsilon_{22}^2}{2} \right)^{1/2}$$

where $\varepsilon$ is the focal error matrix defined as the deviation of the lens vergence matrix $\Lambda$ from its ideal correction $\Lambda_0$ at the reference sphere and may be written $$\varepsilon = \begin{pmatrix} \varepsilon_{11} & \varepsilon_{12} \\ \varepsilon_{21} & \varepsilon_{22} \end{pmatrix}$$

where $\varepsilon_{12} = \varepsilon_{21}$ by the choice of the orthonormal basis set.

By the term "lens element", as used herein we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material such as the material sold under the trade designation CR39.

By the term "astigmatism or surface astigmatism", as used herein we mean a measure of the degree to which the curvature of the lens varies among intersecting planes which are normal to the surface of the lens at a point on the surface.

By the term "zone congruence", as used herein we mean the binocular overlap area of the ray traced RMS power error contours in object space.

By the term "visual fixation locus" we mean the set of points which are the intersection of the lens front surface and the patient's line of sight as he or she fixates on objects in the median plane. The term does not signify a required, continuous eye movement path. Rather, the visual fixation locus indicates the set of points corresponding to variously positioned objects in the median plane.

DETAILED DESCRIPTION

Figure 1A:
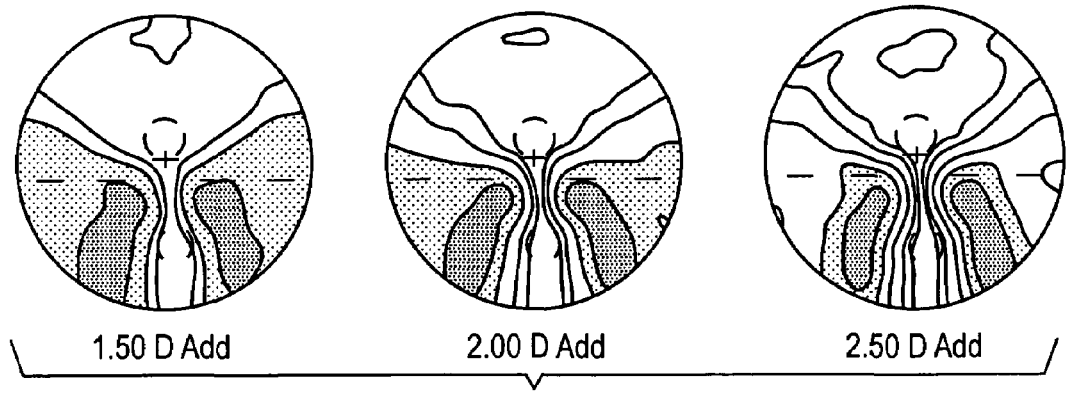
FIGS. 1A, 1B and 1C illustrate a series of contour plots of surface astigmatism of progressive optical lens elements according to the present invention.

Accordingly, in a first aspect of the present invention, there is provided a progressive ophthalmic lens element including a lens surface having an upper viewing zone having a surface power to achieve a refracting power corresponding to distance vision, a lower viewing zone having a different surface power than the upper viewing zone to achieve a refracting power corresponding to near vision; and an intermediate zone extending across the lens element having a surface power varying from that of the upper viewing zone to that of the lower viewing zone one or more of the upper, intermediate and lower viewing zones being designed optically to reduce or minimise a selected measure of blur for the corresponding range of object distances; and at least a portion of the peripheral region of the surface of the ophthalmic lens element being designed to reduce or minimise one or more surface characteristics known to correlate with the sensation of swim.

It will be understood that the present invention permits the progressive lens design to be tailored to improve functionality by increasing the size of areas for clear foveal vision, and wearer acceptance by reducing the likelihood of swim being experienced by the wearer.

In a preferred embodiment, the wearer's perception of blur may be reduced, and thus foveal vision improved, in one or more of the upper, intermediate and lower viewing zones by optimising the optical characteristics of the lens over an area limited by a prescribed variable distance from the visual fixation locus to minimise the RMS power error. More preferably the RMS power error is minimised in the upper and lower viewing zones.

Preferably the optimisation step is such that the surface integral over the zone for foveal vision of RMS power error is minimised.

More preferably, the visual fixation locus from which the RMS power error contours are measured may be defined by clinical measurement. The visual fixation locus is preferably an average fixation locus utilising a population average interpupillary distance (PD) and an average reading distance for a large number of patients requiring a designated addition power. This then may permit development of a representative average visual fixation locus utilising ray tracing techniques.

Accordingly, by establishing this visual fixation locus, the results of optimisation may be substantially improved.

In a preferred form, the lens element surface is so designed as to reduce blur whilst maintaining substantial binocularity or zone congruence in the lower and intermediate viewing zone.

More preferably, the lens element surface is designed as follows an approximately S-shaped cubic spline function is fitted to describe the full range of intermediate object distances between the fitting cross (FC) and the near vision reference point (NRP);

a second approximately S-shaped cubic spline function is fitted to describe the variation of the lens optical vergence addition power such that it does not exceed the wearer's depth of focus value at the FC and provides the required nominal designated surface addition power at the NRP;

a line is calculated on the lens front surface corresponding to the visual fixation locus utilising ray tracing techniques; and surface characteristics are optimised over the specified area to reduce or minimise the surface integral of the weighted RMS power error and e.g. computed by iteratively ray tracing the target lens for the chosen prescription, eye-lens configuration and variable object distance distribution.

In a further preferred embodiment of the present invention, for example, for near emmetropic patients (e.g. requiring surface powers of approximately −1.50 D to approximately +1.50 D, the design of the upper viewing zone and lower viewing zone may be such as to provide substantially equal satisfaction for an average wearer at the designated addition power of the lens element. For example, the respective sizes of the upper and lower viewing zones may be selected to substantially balance optical performance for distance and near vision.

More preferably, the size of the optical field of vision in the lower or near viewing zone may be maintained substantially constant for an object spaced a preselected distance from the wearer's eye, independent of base curve. The optical field of vision is measured as an area limited by the RMS power error contour corresponding to the value of a clinically established threshold for blur that is troublesome to the wearers, e.g. approximately 0.75 D in the near zone.

As discussed above, the progressive ophthalmic lens element according to the present invention provides a reduction in the phenomenon of swim in the peripheral region and thus an improvement in peripheral vision. The wearer's peripheral vision may thus be improved by an individually targeted optimisation of the peripheral regions of the progressive ophthalmic lens element surface to reduce the impact of the phenomenon of swim.

Swim may be reduced in the peripheral region by reducing or minimising one or more surface characteristics that have been found to correlate with the phenomenon of swim, e.g. sagittal addition power deviation and/or the rate of change of the circumferential component of the lens prism.

Accordingly the lens element surface may be designed such that the deviation from a preselected value of sagittal addition power, or the rate of change of the circumferential component of the ray traced lens prism, is reduced or minimised, within the peripheral region.

For example, the preselected value of sagittal addition power may be approximately equal to half the nominal addition power in the lower or near viewing zone.

In addition, in a further preferred embodiment of the present invention, the amount of surface astigmatism may be controlled within the peripheral region, as high levels of this quantity may cause wearer discomfort.

Accordingly the lens element surface may be designed in addition to reduce or minimise the value of surface astigmatism, within the peripheral region.

Preferably the lens element surface may be designed to minimise a weighted sum of two or more swim correlated characteristics. Accordingly the lens element surface may be designed to minimise a weighted sum of surface astigmatism and sagittal addition power variation or rate of change of the circumferential component of ray traced lens prism.

Accordingly, in this aspect of the present invention there is provided a progressive ophthalmic lens element, as described above, wherein the progressive lens element surface exhibits a modified distribution of surface astigmatism in the peripheral region.

Preferably, the distribution of surface astigmatism in the peripheral region adjacent to of the upper or distance viewing zone exhibits a low gradient relative to the gradient proximate the lower or near viewing zone.

Preferably the maximum value of sagittal addition power in two sectors extending out to 30 mm radius from the fitting cross (FC) and spanning a 60° angle, centred on the horizontal line passing through the FC, is maintained at a relatively low level. Preferably, it should not exceed two thirds of the maximum sagittal addition power in the lower or near viewing zone.

Preferably, the maximum level of peripheral surface astigmatism is maintained at a relatively low level, for example no greater than the addition power of the progressive lens element within an approximately 30 mm radius around the fitting cross (FC) thereof.

More preferably, the distribution of surface astigmatism in the distance viewing zone may exhibit a relatively low gradient proximate the lens periphery. Thus the boundary between the distance and peripheral regions may be characterised as relatively soft.

Applicants have found that good performance at the periphery of vision, and in particular a reduction in the level of "swim", has been found to aid wearer acceptance.

The modifications discussed above may, for example, both reduce sensitivity to fitting errors and make the lens easier to adapt to, as the transition between the distance and intermediate peripheral zone is less perceptible. It may also permit a greater smoothing of the rate of change of the circumferential component of the prism gradient over large areas of the peripheral zone lessening the uncomfortable swimming sensation that can be induced by a progressive lens.

It will be understood that the ophthalmic lens element according to the present invention may form one of a series of lens elements.

Accordingly, in a further aspect of the present invention, there is provided a series of progressive ophthalmic lens elements, each lens element including a lens surface having an upper viewing zone having a surface power to achieve a refracting power corresponding to distance vision;

a lower viewing zone having a different surface power than the upper viewing zone to achieve a refracting power corresponding to near vision; and an intermediate zone extending across each lens element having a surface power varying from that of the upper viewing zone to that of the lower viewing zone;

the progressive ophthalmic lens series including a first set of lens elements having a base curve(s) suitable for use in providing a range of distance prescriptions for a first specified category of patient, each lens element within a set differing in prescribed addition power and including a progressive design, such that one or more of the upper, intermediate and lower viewing zones of each lens element is designed optically to reduce or minimise a selected measure of blur for the corresponding range of object distances; and at least a portion of the peripheral region of each lens element surface being designed to reduce or minimise one or more surface characteristics known to correlate with the sensation of swim.

As described above, the wearer's perception of blur may be reduced, and thus foveal vision improved, in one or more of the upper, intermediate and lower viewing zones by optimising the lens surface over an area limited by a prescribed variable distance from the visual fixation locus to minimise RMS power error.

Preferably the optimisation step is such that the surface integral of the weighted RMS power error is minimised over an area limited by a prescribed variable distance from the visual fixation locus in one or more of the upper, intermediate and lower viewing zones.

More preferably the visual fixation locus from which the RMS power error contours are measured is an average fixation locus for a large number of patients utilising a population average interpupillary distance and an average reading distance for wearers requiring a designated addition power.

Further, for each progressive ophthalmic lens element, a "representative average" visual fixation locus may be established for each category of wearer utilising direct clinical measurement methods, as described above.

Each lens element surface may be designed to reduce blur whilst maintaining substantial binocularity or zone congruence in the near and intermediate viewing zones.

Accordingly, each lens element surface may be designed as follows an approximately S-shaped cubic spline function is fitted to describe the full range of intermediate object distances between the fitting cross (FC) and the near vision reference point (NRP);

a second approximately S-shaped cubic spline function is fitted to describe the variation of the lens optical vergence addition power such that it does not exceed the wearer's depth of focus value at the FC and provides the required nominal designated surface addition power at the NRP;

a line is calculated on the lens front surface corresponding to the visual fixation locus utilising ray tracing techniques; and surface characteristics are optimised over the specified area to reduce or minimise the surface integral of the weighted RMS power error.

More preferably, the size of the optical field of clear vision in the lower viewing or near zone of each progressive ophthalmic lens element may be maintained substantially constant for an object spaced a preselected distance from the wearer's eye, independent of base curve, the optical field of clear vision being measured as an area limited by the RMS power error contour corresponding to approximately 0.75 D in the near zone.

In a further preferred embodiment of this aspect of the present invention, the progressive ophthalmic lens element according to the present invention provides a reduction in the phenomenon of swim in the peripheral region and thus an improvement in peripheral vision. The wearer's peripheral vision may thus be improved by an individually targeted optimisation of the peripheral regions of the progressive ophthalmic lens element surface to reduce the impact of the phenomenon of swim. The optimisation step may be based on the criterion of reducing or minimising one or more optical characteristics that have been found to correlate with the phenomenon of swim, e.g. sagittal addition power or the rate of change of the circumferential component of the lens prism and/or surface astigmatism. Preferably the optimisation is achieved by designing each lens element surface to minimise a weighted sum of two or more swim characteristics, as described above.

In addition, in a further preferred embodiment of this aspect of the present invention, the amount of surface astigmatism may be controlled within the peripheral region, as high levels of this quantity may cause wearer discomfort.

In a further preferred embodiment, each lens is designed to reduce swim such that the deviation from a preselected value of sagittal addition power, or the rate of change of the circumferential component of the ray traced lens prism, is reduced or minimised, within the peripheral region.

Preferably, the preselected value of sagittal addition power is approximately equal to half the nominal addition power in the near viewing zone.

More preferably, each lens element surface is designed in addition to reduce or minimise the value of surface astigmatism, within the peripheral region.

In a particularly preferred form, each lens element surface is designed to minimise a weighted sum of surface astigmatism and sagittal addition power variation or the rate of change of the circumferential component of ray traced lens prism.

Applicants have carefully constructed specific objects for ray tracing to assess the viewing zones available for clear distance and near vision respectively and to quantify the size of these zones in object space. The object selected to evaluate the size of the zone available for clear distance vision is an 8×4 m rectangle placed vertically 8 m in front of the viewer's eyes and centred on the straight ahead direction of gaze of the right eye. An average interpupillary distance, PD of 64 min obtained from clinical data, is used in calculating the sizes of the distance and near viewing zones.

The object for evaluating the size of the zone available for clear near vision consists of a flat rectangle the size of an A3 page (420×297 mm) tilted 15° to the vertical plane. The distance of the near object from the eye used for ray tracing depends on the addition power of the lens and is obtained from the clinical data. The areas of clear vision are evaluated from the areas inside ray traced RMS power error contours corresponding to the clinically established thresholds of troublesome blur. These values differ for distance and near vision and are approximately 0.50 D and 0.75 D respectively. Accommodative reserve of (2.50-Add) D is taken into account when evaluating RMS power error experienced by the wearer. Zone sizes available for clear vision are reported as percentage fractions of the full area of the selected object.

As an example, applicants have found that the sizes of distance and near objects are substantially balanced for the central emmetrope 2.00 D addition power lens element ray traced for a piano distance power when the clear zones of vision for both selected distance and near objects represent approximately 50%.

More preferably, the optical performance of the lower or near viewing zone and the peripheral region are substantially equalised for a given addition power and for each base curve. This is illustrated in the lens design series shown in FIG. 4 below.

It is particularly preferred that the maximum value of sagittal addition power in two sectors extending out to approximately 30 mm radius from the fitting cross (FC) and spanning a 60° angle centred on the horizontal line passing through the FC is no more than two thirds of the maximum sagittal addition power in the near viewing zone.

In a further preferred aspect, each lens element surface exhibits a modified distribution of surface power and/or surface astigmatism in the peripheral region.

For example the maximum level of peripheral surface astigmatism is maintained at a relatively low level within an approximate 30 mm radius of the fitting cross (FC) of each lens element.

In a preferred embodiment of this aspect of the present invention, the progressive ophthalmic lens element series may further include:

a second set of lens elements having a base curve(s) suitable for use in providing a range of distance prescriptions for a second category of patient;

each lens element within a set differing in prescribed addition power and including a progressive design such that, one or more of the upper, intermediate and lower viewing zones of each lens element is designed optically to minimise a selected measure of blur for the corresponding range of object distances; and at least a portion of the peripheral region of each lens element surface being designed to minimise one or more surface characteristics known to correlate with the sensation of swim;

the surface characteristics of the lens elements in the first set in the zone(s) optimised to minimise blur differing substantively in progressive design from the corresponding lens elements in the second set due to the differences in optical requirements of the Rx range intended for this/these base curve(s).

The first and second categories of patients referred to herein may be selected from the group consisting of myopes, emmetropes and hyperopes. Preferably the first category are emmetropic patients and the second category are myopic patients.

By the term "myopic patients" we mean patients suffering from short-sightedness: A condition of the eye in which parallel rays of light come to a focus in front of the retina, and which is corrected with a diverging lens.

By the term "emmetropic patients" we mean patients who exhibit a condition of the eye, in which parallel rays of light come to a focus approximately on the retina.

By the term "hyperopic patients" we mean patients suffering from long-sightedness. This is a condition of the eye in which parallel rays of light come to a focus behind the retina, and which is corrected with a converging lens.

Where the first category of patients are emmetropic patients, the design of the upper viewing zone and lower viewing zone may be such as to provide substantially equal satisfaction for an average wearer at the designated addition power of each lens element. Accordingly, the respective sizes of the optical field of vision in the upper and lower viewing zones are selected to substantially balance optical performance for distance and near vision.

For example, the sizes of distance and near objects as described above are substantially balanced for emmetropic 2.00 D addition power lens elements when the optical fields of vision for both distance and near objects represent approximately 50% of the full size of the objects.

In a still further preferred embodiment, the progressive ophthalmic lens element series may further include a third set of lens elements having a base curve(s) suitable for use in providing a range of distance prescriptions for a third category of patient;

each lens element within the third set differing in prescribed addition power and including a progressive design such that one or more of the upper, intermediate and lower viewing zones of each lens element is designed optically to minimise a selected measure of blur for the corresponding range of object distances; and at least a portion of the peripheral region of each lens element surface being designed to minimise one or more surface characteristics known to correlate with the sensation of swim;

the surface characteristics of the lens elements in the third set in the zones optimised to minimise blur differing substantively in progressive design from the corresponding lens elements at the same addition power in the first and second sets due to the differences in optical requirements of the Rx range intended for this/these base curve(s).

The third category of patients differs from the first and second categories and may be selected from myopic, emmetropic or hyperopic patients. Preferably the third category of patients are hyperopic patients.

In a preferred form of this aspect of the present invention, the size of the optical field of clear vision in the lower viewing zone is maintained substantially constant for an object spaced a pre-selected distance from the wearer's eye, independent of base curve; the optical field of clear vision being measured as an area limited by the RMS power error contour corresponding to approximately 0.75 D.

As stated above, applicants have found that the design requirements for progressive lenses differ as to whether the wearer is a myope, emmetrope, hyperope, or other category of patient, the lens base curve, distance prescription and the level of addition power required by the wearer.

The progressive ophthalmic lens series may include four or more sets of lenses to accommodate other groups of patients. For example additional sets of lenses for high myopic patients and/or high hyperopic patients may be included.

The progressive ophthalmic lens element series may preferably include 5 base curves with, e.g. 9 to 12 addition powers per base curve, for example in 0.25 D increments, resulting in a total of up to 60 discrete lens element pairs (left and right).

In a further aspect of the present invention, it will be understood that the design of the intermediate zone of the or each progressive ophthalmic lens element is based on a line called the "eye path" or "visual fixation locus" along which the optical power of the lens increases more or less uniformly. It is normal to select an eye path to accommodate an assumed convergence of the eyes along the path beginning at the fitting cross in the distance zone and slanting nasally to the lower or near viewing zone.

Most conventional progressive lenses are designed based on eye paths which are optimised in the lower viewing region for a refraction distance of 40 cm or closer, a distance at one extreme of the normal range.

Applicants have found that, in order to further improve optical performance within the lower or near viewing zone and intermediate zone, it is necessary to have differing optical designs for wearers requiring respectively low addition powers and high addition powers, and this in turn affects the shape and position of the eye path or visual fixation locus.

Applicants have further found that the design should be such as to reflect the true reading distances for wearers requiring higher addition powers.

Accordingly in a further preferred aspect of the present invention, the progressive ophthalmic lens element or each lens element within a set, having a low addition power, exhibits a relatively shallow power progression profile just below the fitting cross (FC); and having a high addition power exhibits a relatively steep power progression just below the FC and a rolling off of surface power below the near reference point (NRP).

Applicants have surprisingly found, through extensive empirical research, that the true reading distance for high addition wearers differs from the generally accepted industry norm, namely the reciprocal of the required addition power, but in fact is slightly greater. Applicants have found that the above modifications to the power progression profile have the effect of increasing the utility of the lens to wearers of each group of addition powers.

By the term "low addition powers" as used herein, we mean addition powers up to and including 1.50 D.

By the term "high addition powers" as used herein, we mean addition powers greater than or equal to 2.50 D.

For example, for a 3.00 D addition power user, the presumed reading distance in the prior art is approximately 33 cm. Applicants have found for example that the average true reading distance for a 3.00 D addition power wearer is approximately 37 cm and for a 2.00 D addition power wearer is approximately 42 cm.

It will be recognised that the "rolling off" of the power progression profile in high addition power lens designs results in a lower or near viewing zone providing relatively low blur at the representative average reading distances for wearers requiring the selected higher addition powers.

It will further be recognised that for wearers requiring low addition powers, there is a greater area of clear vision around the fitting cross (FC) of each progressive ophthalmic lens element. These modifications may provide a reduced sensitivity to fitting errors for those wearers requiring only low addition powers, e.g. first time presbyopic wearers.

Moreover, this permits usage of the distance zone of the lens element for viewing objects at intermediate distances, e.g. computer monitors, as the low addition power wearers still exhibit significant accommodative reserve.

Applicants have found still further that optical performance, and thus wearer acceptance, is further improved where the eye path shape, when moving from intermediate to near tasks, or vice versa, is such that good optical binocularity or zone congruence is maintained.

It will be understood that in order to achieve a proper fit with, for example, a pair of segmented multifocal lenses, it is preferred to space the optical centres of the distance portion of both lenses in a pair of spectacles according to the patient's interpupillary distance (PD) corresponding to distance vision and to align the segments so that correct binocular visual performance is achieved. To do this, it is necessary to align the segments of the lenses so that the segment centres coincide with the binocular lines of sight and so that the visual boundaries created by the outlines of the segments overlap to obtain the maximum possible binocular field of view.

Likewise, for the progressive lenses it is necessary to align the visual fixation locus with the centre line of the intermediate and near zones, so that the boundaries of the clear zones of vision, formed by the contours of troublesome blur for each eye, overlap to achieve the maximum possible binocular field of view.

Accordingly, in a preferred aspect, there is provided a progressive ophthalmic lens element including a lens surface having:

an upper viewing zone having a surface power to achieve a refracting power corresponding to distance vision;

a lower viewing zone having a different surface power than the upper viewing zone to achieve a refracting power corresponding to near vision; and an intermediate zone extending across the lens element having a surface power varying from that of the upper viewing zone to that of the lower viewing zone;

one or more of the upper, intermediate and lower viewing zones being designed optically to minimise a selected measure of blur for the corresponding range of object distances;

at least a portion of the peripheral region of each lens element surface being designed to minimise one or more surface characteristics known to correlate with the sensation of swim; and the degree of zone congruence of the ophthalmic lens element in the intermediate zone is increased, and consequently in the lower viewing zone is slightly decreased.

Applicants have found that the performance of the lens element may be improved, relative to prior art lenses, by adjusting the balance of zone congruence, and in particular to improve zone congruence in the intermediate zone, albeit at the expense of a slight decrease in zone congruence in the lower viewing zone.

In particular the degree of zone congruence may be consequently decreased slightly in the lower viewing zone at the tip of the contours associated with troublesome blur.

The progressive ophthalmic lens element according to this aspect of the present invention may form one of a series of lens elements as described above.

Applicants have recognised that the fact that the intermediate zone of, for example, a general purpose progressive lens is the smallest of the three zones intended for clear foveal vision and with the increased use of computers, e.g. in the presbyopic population often requires prolonged viewing through this small zone suggests the importance of ensuring good binocular overlap between the left and right eye lens zones for intermediate vision.

The degree of optical binocularity or zone congruence may be measured utilising ray tracing techniques. For example, binocular ray tracing may be set up for the plane tilted 10° to the vertical plane at a distance of approximately 70 cm from the cornea of the wearer. Accommodation for this intermediate object distance is in this example assumed to be 60% of that which can be exercised for the near vision. The average interpupillary distance PD is assumed to be 64 mm.

The improvement in zone congruence in the intermediate zone may be achieved at the expense of a slight apparent decrease in zone congruence in the lower or near viewing zone. However, this loss occurs at the tip of the troublesome blur threshold contours and is unlikely to be of importance for the wearer's near vision. This is illustrated in FIGS. 5A to 5H below.

Mathematical Description of Lens Surface

In a still further aspect of the present invention, there is provided a method of designing a progressive ophthalmic lens element including a first lens surface having an upper viewing zone having a surface power corresponding to distance vision, a lower viewing zone having a different surface power than the upper viewing zone to achieve a refracting power corresponding to near vision; and an intermediate zone extending across the lens element having a surface power varying from that of the upper viewing zone to that of the lower viewing zone one or more of the upper, intermediate and lower viewing zones of each lens element is designed optically to minimise a selected measure of blur for the corresponding range of object distances; and at least a portion of the peripheral region of each lens element surface being designed to minimise one or more surface characteristics known to correlate with the sensation of swim;

which method includes selecting a base surface function for the lens surface.

wherein, for a symmetrical design, the base surface function is a Taylor expansion as follows:

$$z(x, y) = z_0(y) + \frac{h(y)}{2}x^2 + \frac{x^4}{12}[g_0(y) + g_2(y)x^2 + \cdots]$$

wherein the functions $z_0(y)$ and $h(y)$ are determined by the desired eye path power progression profile $p(y)$ the functions $g_i(y)$ are free coefficients; and for an asymmetric design, the x-coordinate is substituted by the transformed equivalent $\zeta=x-u(y)$ wherein the function $u(y)$ describes the variation of the inset along the eye path; and odd powers of $\zeta$ are added in the Taylor expansion;

selecting a first merit function to minimise the weighted ray traced RMS power error within the optical zones;

computing the coefficients $g_i(y)$ of the surface function that minimise the first merit function within the upper and lower viewing zones of the ophthalmic lens element;

separately selecting a second merit function to minimise one or more surface characteristics known to correlate with the sensation of swim, e.g. sagittal addition power and/or the rate of change of the circumferential component of the lens prism and/or surface astigmatism, within at least the peripheral region;

computing the coefficients of the surface function that minimise the second merit function within the peripheral region of the ophthalmic lens element; and fabricating an ophthalmic lens element having a lens surface shaped according to said modified surface function.

The first merit function to be minimised may be as follows $$M_1 = \int_R W(\zeta, y) E_{RMS}^2(\zeta, y) d\zeta dy$$

where $W(\zeta, y)$ are the weights and integration is done over the area of the lens surface.

The second merit function may be set to minimise the deviation from a preselected value of sagittal addition power or the rate of change of the circumferential component of the ray traced lens prism, within the peripheral region.

More preferably, the second merit function is set to minimise in addition the value of surface power and/or astigmatism within the peripheral region.

The merit function to be minimised in the second stage of the optimisation process may be a compound merit function M which is made up of two parts, as follows $$M=M_F+M_P,$$

where $M_F$ is a function which relates to the region of the surface for foveal vision $$M_F = W_F \int_{R_F} \varepsilon_{RMS}^2(\zeta, y) d\zeta dy$$

and $M_P$ is a function which relates to the peripheral region of the surface $$M_P = \int_{R_P} \{W_1 \Delta^2(\zeta, y) + W_2[K_{\theta\theta}(\zeta, y) - P_\theta]^2\} d\zeta dy.$$

wherein $\varepsilon_{RMS}$ is the ray traced (RMS) power error of the surface, relative to some specified starting surface (which would usually have been designed to achieve good focal properties);

$\Delta$ is the surface astigmatism;

$K_{\theta\theta}$ is the sagittal curvature;

$P_\theta$ is a specified target sagittal curvature;

$W_F, W_1, W_2$ are appropriately selected weights, $R_F$ is the portion of the lens which is intended primarily for "foveal" vision, and $R_P$ is the portion of the lens that is intended for peripheral vision only.

Typically the weight $W_F$ for the foveal component of this merit function is set to be much larger than the weights used in the peripheral component ensuring that the foveal zones change very little while the peripheral zone is being optimised.

The progressive ophthalmic lens element according to the present invention may be formulated from any suitable material. A polymeric material may be used. The polymeric material may be of any suitable type. The polymeric material may include a thermoplastic or thermoset material. A material of the diallyl glycol carbonate type, for example CR-39 (PPG Industries) may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

The ophthalmic lens element according to the present invention may further include standard additional coatings to the front or back surface, including electrochromic coatings.

The front lens surface may include an anti-reflective (AR) coating, for example of the type described in U.S. Pat. No. 5,704,692 to Applicants, the entire disclosure of which is incorporated herein by reference.

The lens surfaces may include an abrasion resistant coating. e.g. of the type described in U.S. Pat. No. 4,954,591 to Applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

The present invention will now be more fully described with reference to the accompanying figures and examples. It should be understood, however, that the description following is illustrative only and should not be taken in any way as a restriction on the generality of the invention described above.

Figure 1B:
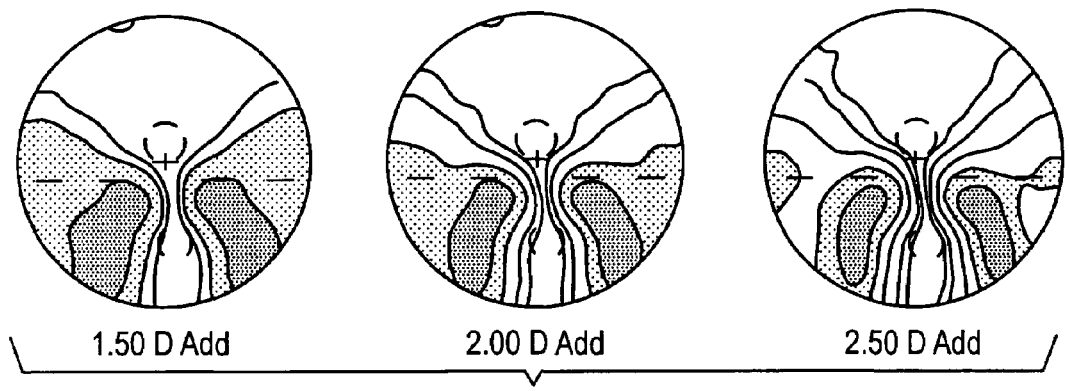
Figure 1C:
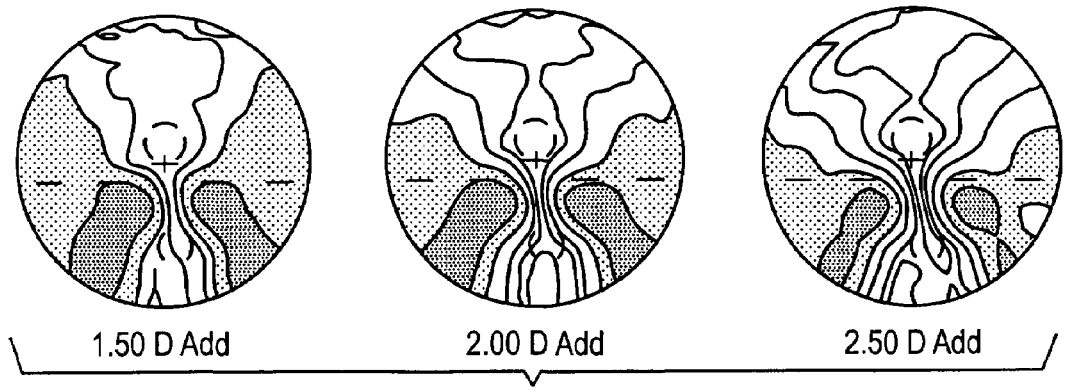

FIGS. 1A, 1B and 1C illustrate a series of contour plots of surface astigmatism of progressive optical lens elements according to the present invention, having respectively 3.25 D base, 4.50 D base, and 6.25 D base surfaces and addition powers of 1.50 D, 2.00 D and 2.50 D. The grey contour line corresponds to 0.25 D, the first shaded contour represents 0.5 D and the remaining contours are incremented by 0.5 D. The diameter of each circle is 60 mm. The ink mark lines indicating the datum line of the design, the FC and the arcs centred on the measurement points for the distance power and the near power are also shown.

Figure 2A:
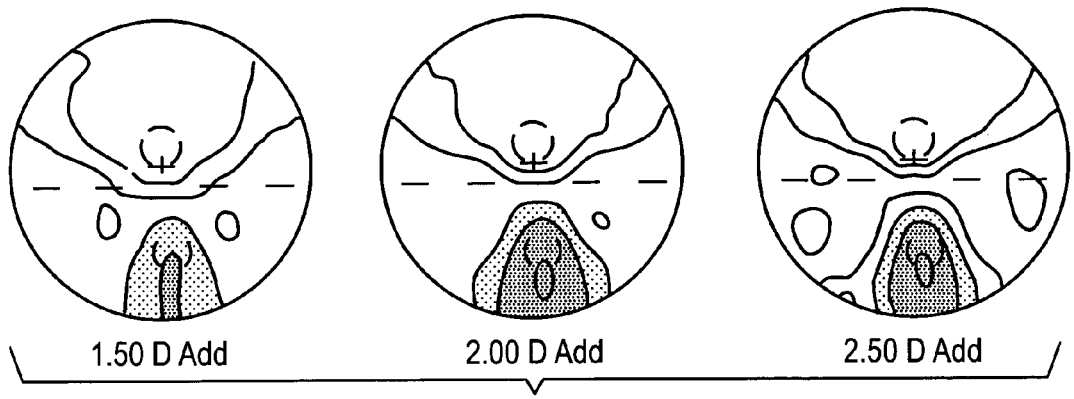
FIGS. 2A, 2B and 2C illustrate a series of contour plots of surface mean power offset by the base curve power of progressive optical lens elements according to the present invention.
Figure 2B:
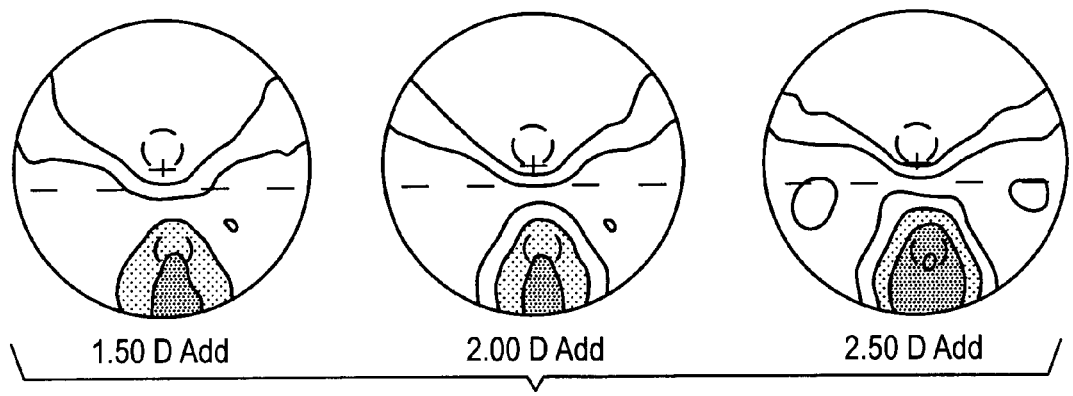
Figure 2C:
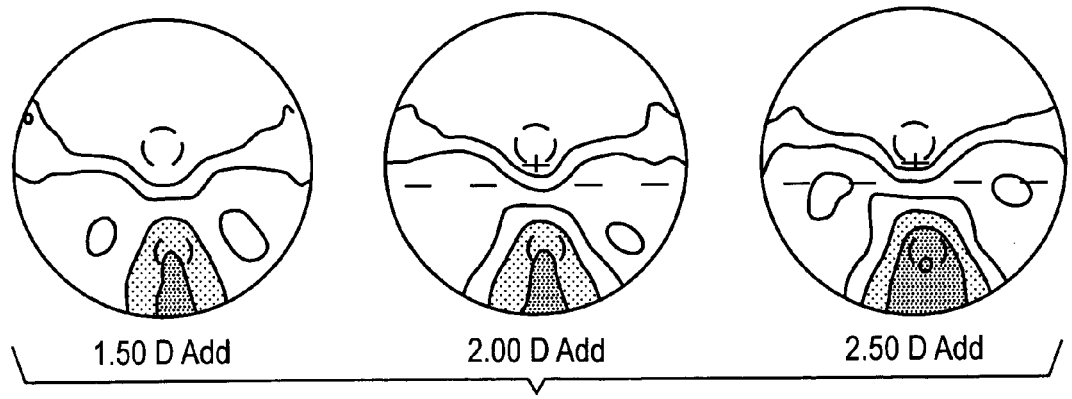

FIGS. 2A, 2B and 2C illustrate a series of contour plots of surface mean power offset by the base curve power of progressive optical lens elements according to the present invention, having respectively 3.25 D base, 4.50 D base, and 6.25 D base surfaces and addition powers of 1.50 D, 2.00 D and 2.50 D. The contour values are the same as in FIG. 1.

Figure 3A:
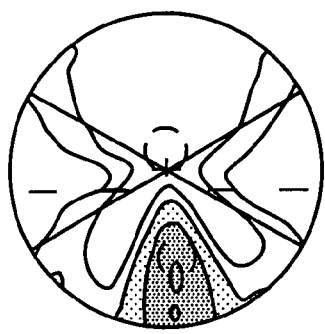
FIGS. 3A, 3B and 3C illustrate a series of contour plots of surface sagittal power offset by the base curve power of progressive optical lens elements according to the present invention.
Figure 3A:
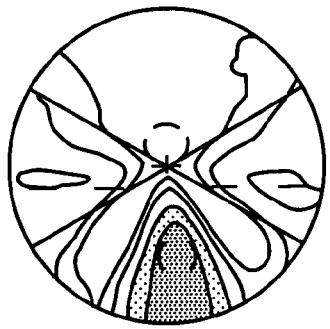
Figure 3A:
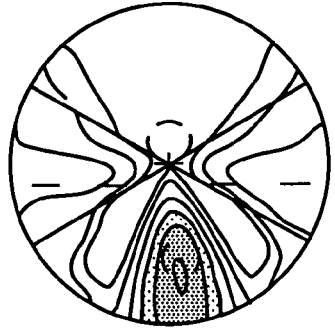
Figure 3B:
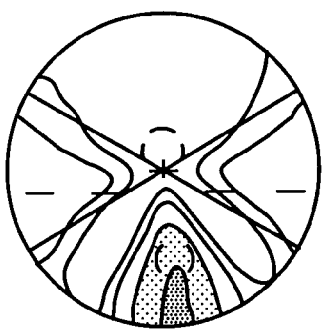
Figure 3B:
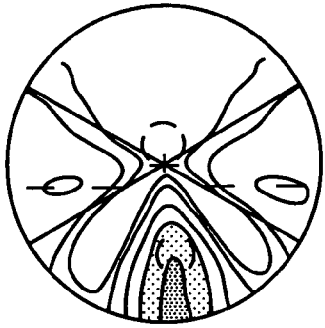
Figure 3B:
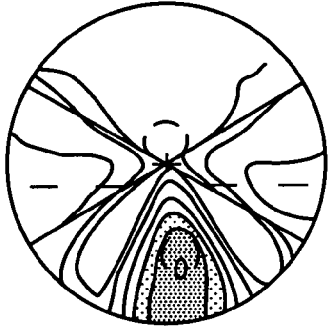
Figure 3C:
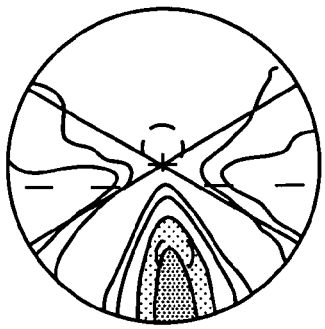
Figure 3C:
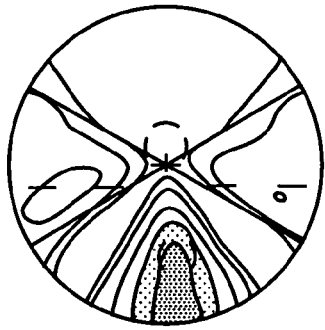
Figure 3C:
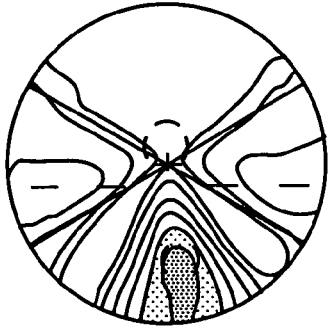

FIGS. 3A, 3B and 3C illustrate a series of contour plots of surface sagittal power offset by the base curve power of progressive optical lens elements according to the present invention, having respectively 3.25 D base, 4.50 D base, and 6.25 D base surfaces and addition powers of 1.50 D, 2.00 D and 2.50 D. The contour values are the same as in FIG. 1.

The intersecting lines define two sectors extending from the fitting cross (FC) and each spanning a 600 angle centred on the datum line.

The contour plots in FIGS. 1, 2 and 3 illustrate variations in progressive design with base curve and increasing addition power.

Figure 4A:
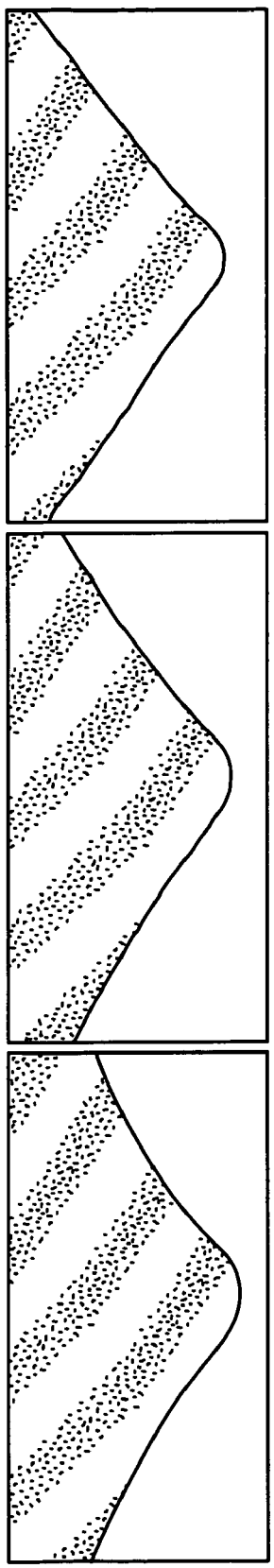
FIGS. 4A and 4B illustrate a series of contour plots of ray traced RMS power error contours for the distance and near viewing zones respectively for the progressive optical lens elements having respectively 3.25 D base (distance Rx=−3.00 D), 4.50 D base (distance Rx plano), and 6.25 D base (distance Rx=+3.00 D) surfaces and a 2.00 D addition power.
Figure 4B:
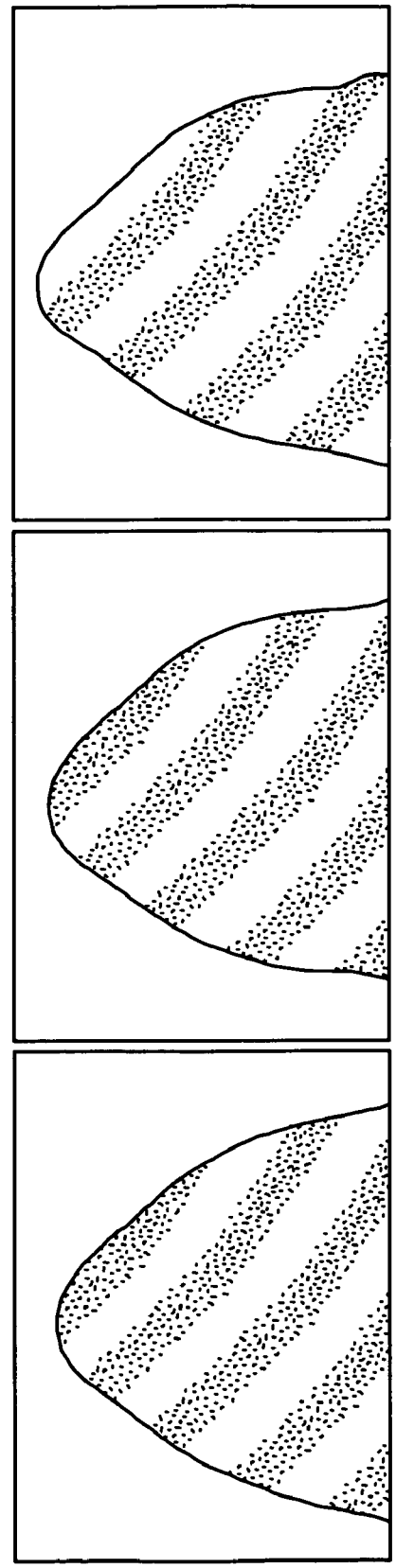
Figure 5A:
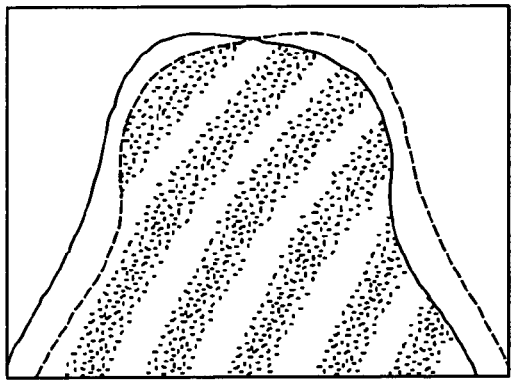
FIGS. 5A to 5H illustrate a series of close-up contour plots of progressive ophthalmic lenses in which 5A, 5C, 5E and 5G are prior art commercial lenses and 15 5B, 5D, 5F and 5H are progressive ophthalmic lens elements according to the present invention.
Figure 5B:
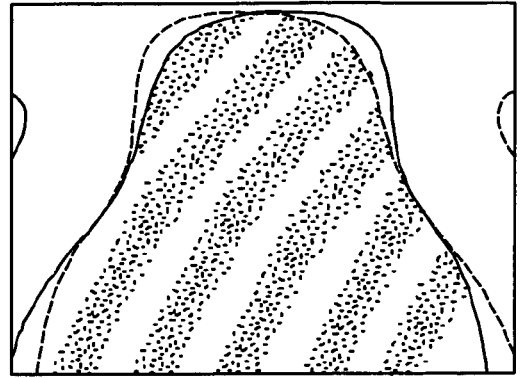
Figure 5C:
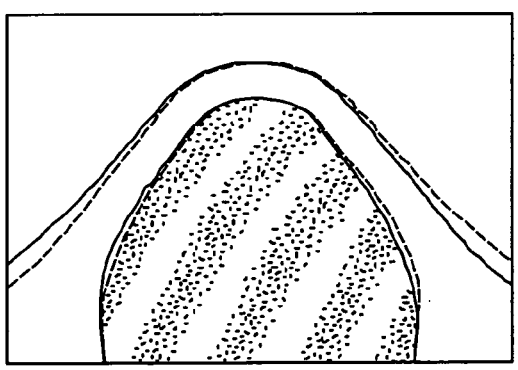
Figure 5D:
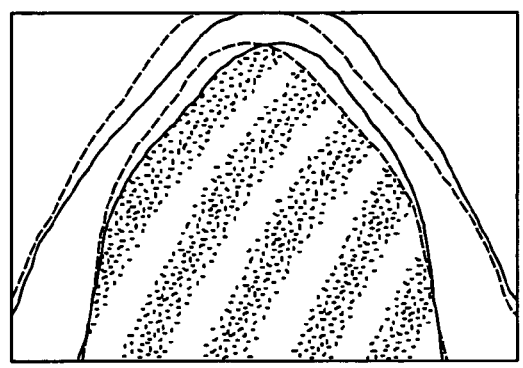
Figure 5E:
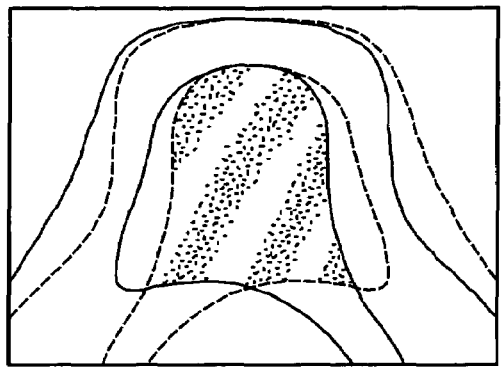
Figure 5F:
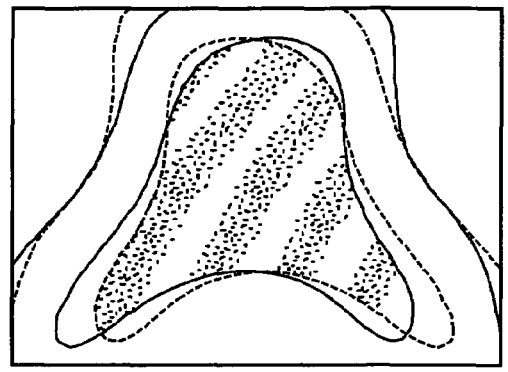
Figure 5G:
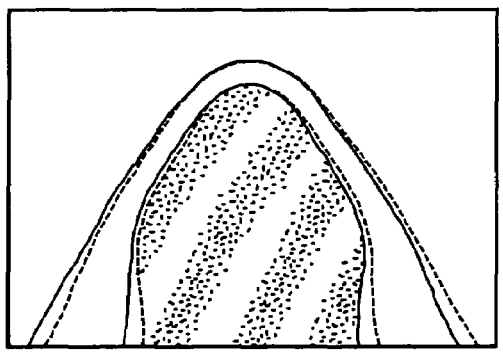
Figure 5H:
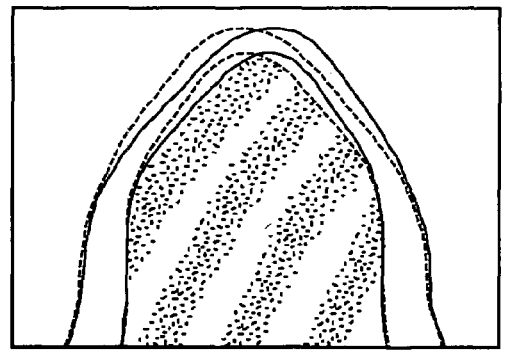

FIGS. 4A and 4B illustrate a series of contour plots of ray traced RMS power error contours for the distance and near viewing zones respectively for the progressive optical lens elements having respectively 3.25 D base (distance Rx=−3.00 D), 4.50 D base (distance Rx piano), and 6.25 D base (distance Rx=+3.00 D) surfaces and a 2.00 D addition power. The contour line shown in each plot corresponds to the clinically established values of troublesome blur. For distance vision objects this value is 0.5 D, for near vision objects the value is 0.75 D. The shaded areas define areas below the troublesome blur contour threshold and are in FIG. 4A (Distance Vision) 52.3%, 48.1% and 43.3% respectively, and in FIG. 4B (Near Vision) 49.6%, 48.9% and 49.3% respectively. The object setup for ray tracing is described above. The eye-lens configuration is the same as that described in Example 1 below.

These plots demonstrate substantial near zone size equalisation by base curve for the near viewing object and illustrate the preferred distance to near zone size ratio to substantially balance the relative performance of these zones for the different degrees of ametropia.

FIGS. 5A to 5H illustrate a series of close-up contour plots of progressive ophthalmic lenses in which 5A, 5C, 5E and 5G are prior art commercial lenses and 5B, 5D, 5F and 5H are progressive ophthalmic lens elements according to the present invention.

Two examples of optical binocularity zone congruence in prior art lenses and the present invention are shown in FIGS. 5A to 5D (1.50 D addition power) and FIGS. 5E to 5H (2.00 D addition power). FIGS. 5A and 5C and FIGS. 5E and 5G illustrate prior art lenses having 4.50 D base curve and distance Rx=0.00 D. FIGS. 5B and 5D and 5F and 5H illustrate corresponding lenses according to the present invention. The binocular ray traces are showing the contours of RMS power error corresponding to 0.50 D and 0.75 D derived from the right eye (solid lines) and the left eye (broken lines) respectively and overlayed on the object of A3 page (400×297 mm) for the near vision and a 21 inch computer monitor (400×300 mm) for the intermediate vision. The shaded area indicates the binocular overlap zone size for the 0.5 D blur contour. The respective binocular overlap areas, expressed as percentage fractions of the full area of the object, are indicated below in Table 1.

TABLE 1

| Figure | Addition Power (D) (Rx = 0.00 D) | Zone | Binocular overlap (%) |
|---|---|---|---|
| 5A (Prior art) | 1.50 | Intermediate vision | RMSPE < 0.5 D = 51.6% |
| 5B (Invention) | 1.50 | Intermediate vision | RMSPE < 0.5 D = 57.9% |
| 5C (Prior art) | 1.50 | Near vision | RMSPE < 0.5 D = 35.6%<br>RMSPE < 0.75 D = 59.2% |
| 5D (Invention) | 1.50 | Near vision | RMSPE < 0.5 D = 44.8%<br>RMSPE < 0.75 D = 67.9% |
| 5E (Prior art) | 2.00 | Intermediate vision | RMSPE < 0.50 D = 19.6% |
| 5F (Invention) | 2.00 | Intermediate vision | RMSPE < 0.5 D = 27.7% |
| 5G (Prior art) | 2.00 | Near vision | RMSPE < 0.50 D = 28.4%<br>RMSPE < 0.75 D = 44.9% |
| 5H (Invention) | 2.00 | Near vision | RMSPE < 0.50 D = 35.7%<br>RMSPE < 0.75 D = 49.5% |

Figure 6:
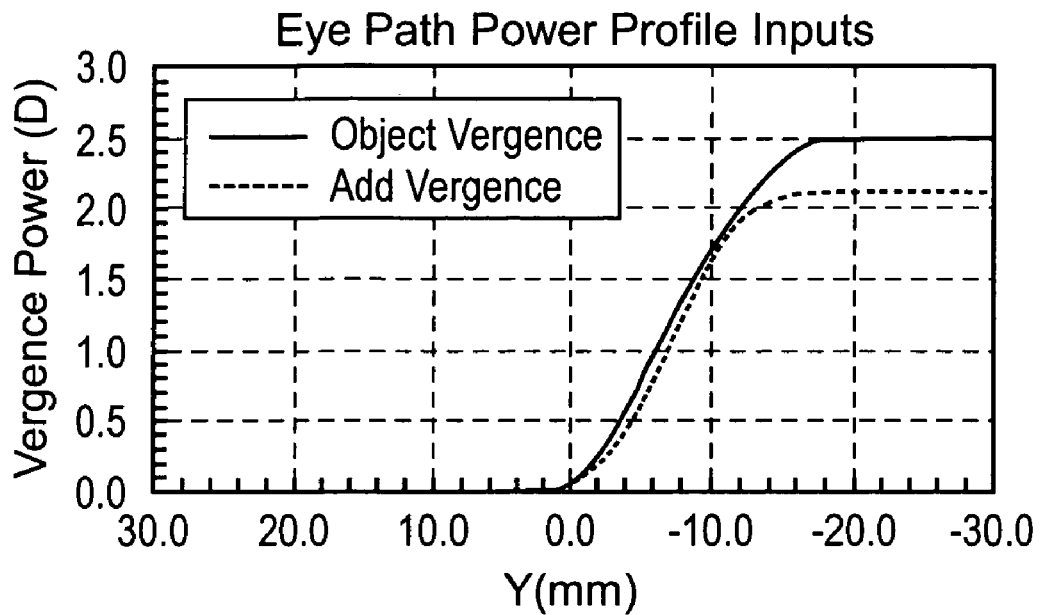
FIG. 6 is a graph illustrating the variation of the object vergence and add vergence with the vertical Y-coordinate used to design the progressive ophthalmic lens element in Example 1.

FIG. 6 is a graph illustrating the variation of the object vergence and add vergence with the vertical Y-coordinate used to design the progressive ophthalmic lens element in Example 1. The origin of the coordinate system is at the FC.

Figure 7:
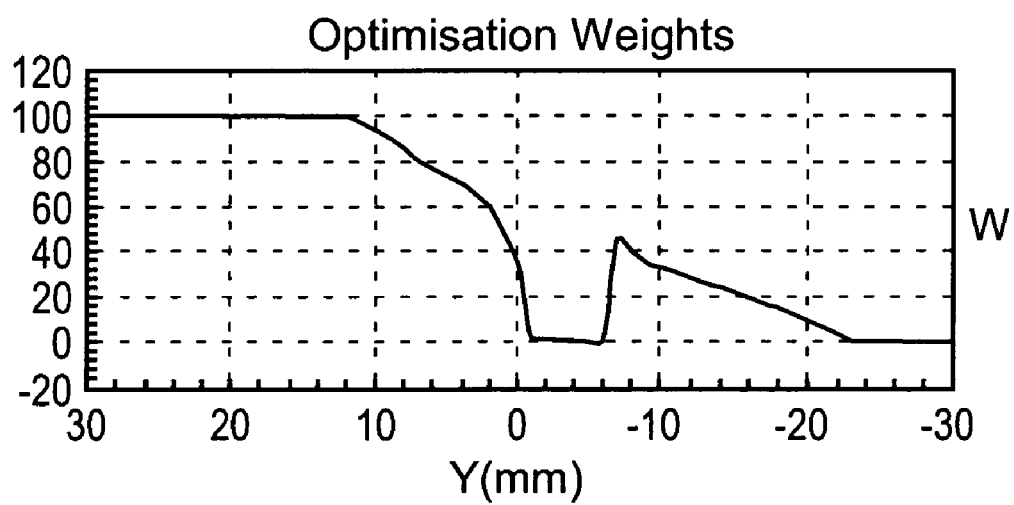
FIG. 7 is a graph illustrating the variation of optimisation weights along the eye path for the first stage of the optimisation process used to design the progressive ophthalmic lens element in Example 1.

FIG. 7 is a graph illustrating the variation of optimisation weights along the eye path for the first stage of the optimisation process used to design the progressive ophthalmic lens element in Example 1.

Figure 8:
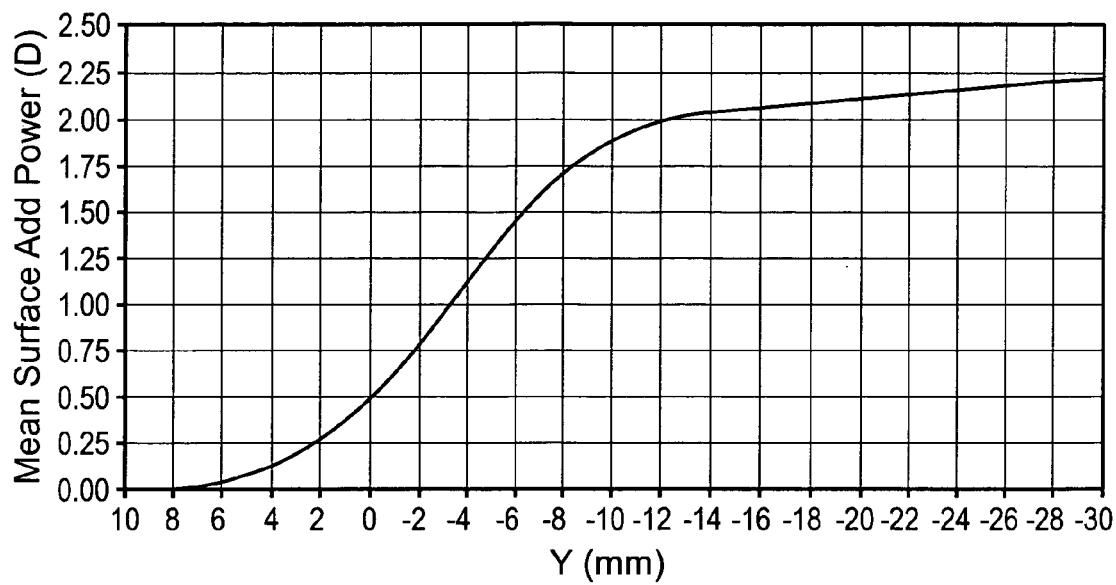
FIG. 8 is a graph illustrating the variation in mean surface add power along the eye path of the progressive ophthalmic lens element in Example 1.

FIG. 8 is a graph illustrating the variation in mean surface add power along the eye path of the progressive ophthalmic lens element in Example 1.

Figure 9:
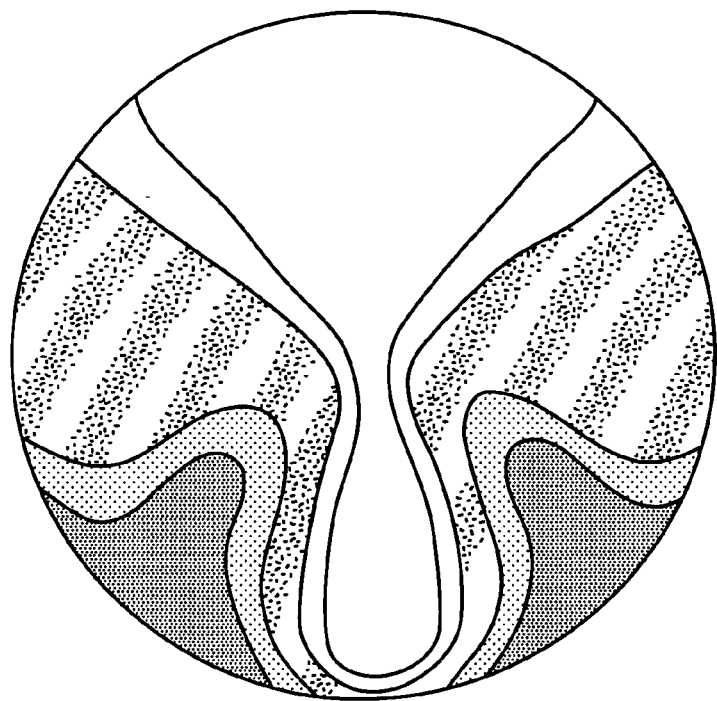
FIG. 9 demonstrates the RMS power error distribution of the Example 1 progressive ophthalmic lens element ray traced for the piano distance power, variable object distance and assumed accommodative reserve of 0.5 D.

FIG. 9 demonstrates the RMS power error distribution of the Example 1 progressive ophthalmic lens element ray traced for the piano distance power, variable object distance and assumed accommodative reserve of 0.5 D. The contour values are the same as in FIG. 1. The diameter of the circle is 60 mm.

Figure 10:
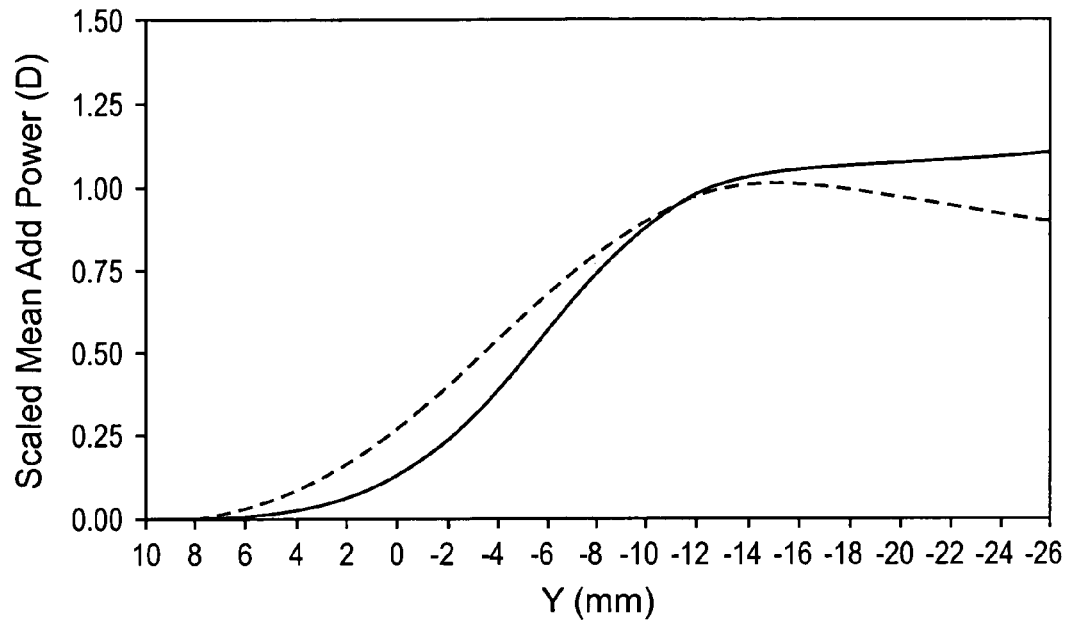
FIG. 10 is a graph illustrating the variation in scaled mean surface addition power along the eye path (power progression profile) for a low addition power lens according to the present invention (1.00 D, broken line) and a high addition power lens according to the present invention (3.00 D, solid line).

FIG. 10 is a graph illustrating the variation in scaled mean surface addition power along the eye path (power progression profile) for a low addition power lens according to the present invention (1.00 D, broken line) and a high addition power lens according to the present invention (3.00 D, solid line). The power progression profile of the 3.00 D addition power lens is scaled for comparison with the 1.00 D addition power lens. The low addition power lens exhibits a relatively shallow power progression profile below the FC at Y=4 mm and the high addition power lens exhibits a relatively steep power progression in this area.

Figure 11:
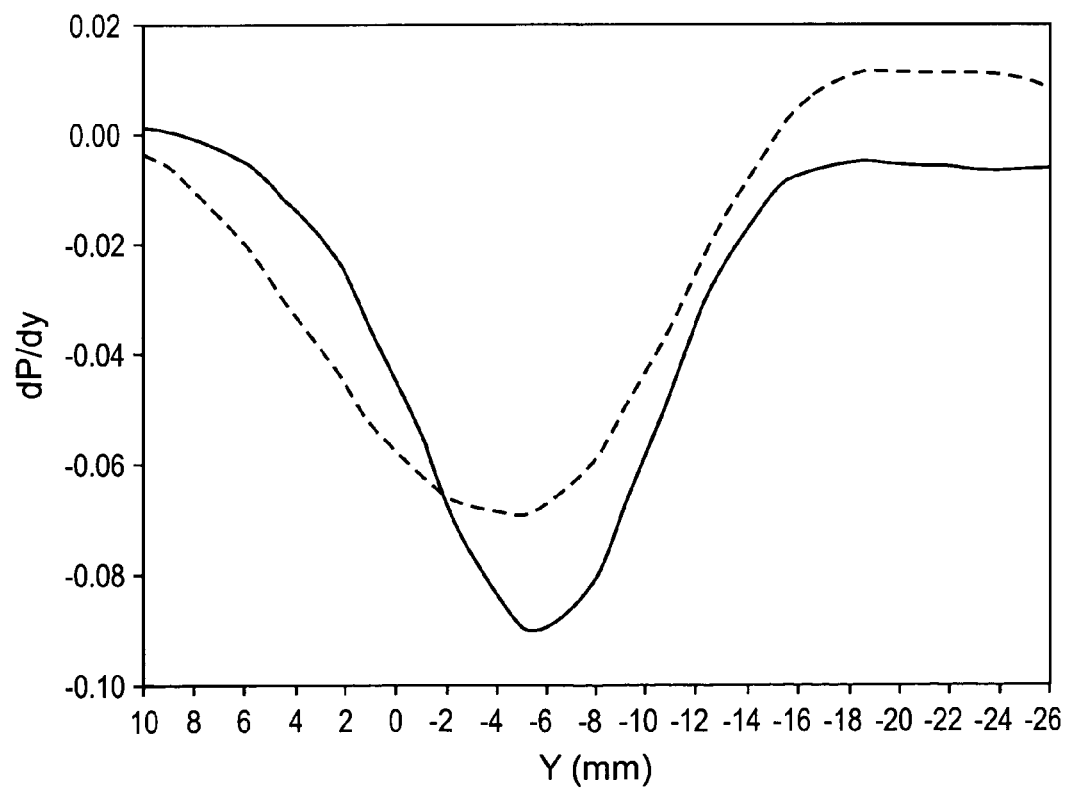
FIG. 11 is a graph illustrating the variation in power gradients along the eyepath of the lenses illustrated in FIG. 10.

FIG. 11 is a graph illustrating the variation in power gradients along the eyepath of the lenses illustrated in FIG. 10.

Figure 12:
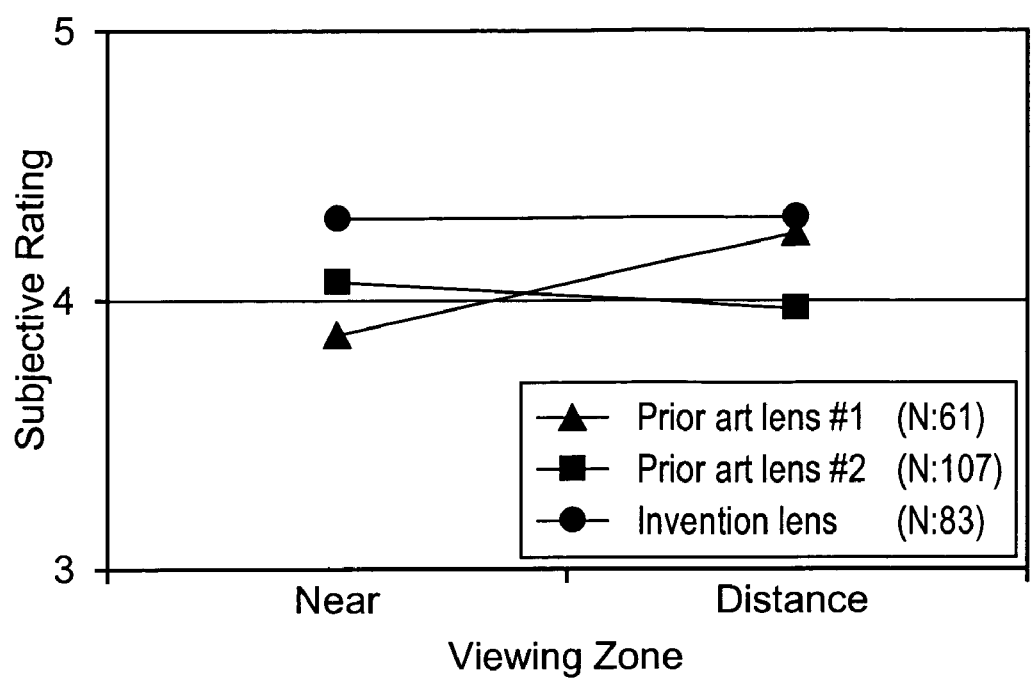
FIG. 12 is a graph of the mean subjective satisfaction of emmetropic wearers for the near and distance vision with three different- progressive lenses (two commercial prior art lenses and a lens according to the present invention), on a 5—point scale (from 1—very poor to 5- very good).

FIG. 12 is a graph of the mean subjective satisfaction of emmetropic wearers for the near and distance vision with three different progressive lenses (two commercial prior art lenses and a lens according to the present invention), on a 5-point scale (from 1—very poor to 5—very good). The sample size N in each of the wearer trials is shown in the legend.

The trials illustrate a substantially equivalent visual performance leading to a substantially equal satisfaction for distance and near vision for emmetropic wearers utilising lenses according to the present invention.

EXAMPLE 1

An optical lens element according to the present invention may be designed as follows:

A progressive ophthalmic lens element for an emmetropic wearer requiring piano distance and 2.00 D near correction was designed. The lens was made from a plastic material of refractive index 1.499 and with the front surface base curve of 4.50 D (at n=1.530 index), centre thickness of 2 mm.

The "eye-lens configuration" parameters to be specified for ray tracing are as follows: the pupil centre is lined up with the point at 4 mm vertically above the geometric centre (GC), the interpupillary distance PD is equal to 64 mm, distance from the centre of rotation of the eye to the back vertex point of the lens is 27 mm, the pantoscopic tilt of the lens is 7° and the horizontal wrap angle of the lens is zero.

The variation of the object vergence distance and lens addition power vergence with the vertical coordinate on the reference sphere along the eye path, whose origin is at the FC (located 4 mm above the GC), is shown in FIG. 6. The optimisation weights have the shape of a sequence of smoothly blended one-dimensional gaussian functions of the x-coordinate centred on the visual fixation locus. The magnitude of the weight along the visual fixation locus varies with the y-coordinate as illustrated in FIG. 7. The e-folding widths of this two-dimensional gaussian function vary from 25 mm in the higher regions of the distance zone and decrease down to about 10 mm in the near zone.

A selected program first solves the optimisation problem for the areas intended for foveal vision. It uses the optimisation merit function $M_1$. The solution procedure is iterative and requires several iterations to arrive at the optimum solution characterised by the minimum value of the global RMS power error.

In the second stage of the design process, the optimisation merit function is changed to $M_2$ and the optimisation weight distribution is rearranged to separate the peripheral regions of the lens element from the area intended for foveal vision, (which has already been optimised in the first stage). In this example the boundary of the area of the lens element $R_P$ to be optimised for peripheral vision follows approximately the 1.00 D surface astigmatism contours of the first stage designs. The weights used for the second stage optimisation were as follows:

$W_F$=20.0
$W_1$=0.15
$W_2$=1.00.

The target peripheral value for sagittal power $P_\theta$=5.25D (at n=1.530 index) and the surface astigmatism target is zero.

The surface astigmatism, mean power and sagittal power contours of the final design are illustrated in FIGS. 1, 2 and 3 (the central design of the matrix). The surface mean power and astigmatism profiles along the eye path are illustrated in FIG. 8. The RMS power error distribution contours of this lens design ray traced for the object distance varying with the y-coordinate, as illustrated in FIG. 6, and constant with the x-coordinate are displayed in FIG. 8.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A progressive ophthalmic lens element including a lens surface having
    an upper viewing zone having a surface power to achieve a refracting power corresponding to distance vision,
    a lower viewing zone having a different surface power than the upper viewing zone to achieve a refracting power corresponding to near vision, and
    an intermediate zone extending across the lens element having a surface power varying from that of the upper viewing zone to that of the lower viewing zone;
    one or more of the upper, intermediate and lower viewing zones being designed optically to reduce or minimise a selected measure of blur for the corresponding range of object distances, and wherein the selected measure of blur is the RMS power error, the surface integral of the weighted RMS power error being minimised over an area limited by a prescribed variable distance from the visual fixation locus in one or more of the upper, intermediate and lower viewing zones;
    at least a portion of the peripheral region of the surface of the ophthalmic lens element being designed to reduce or minimise one or more surface characteristics known to correlate with the sensation of swim.

2. A lens element according to claim 1, wherein the visual fixation locus from which the RMS power error contours are measured, is an average fixation locus utilising a population average interpupillary distance and an average reading distance for a number of patients requiring a designated addition power.

3. A lens element according to claim 1, wherein the weighted RMS power error is minimised in the upper and lower viewing zones.

4. A lens element according to claim 3, wherein the lens element surface is designed as to reduce blur whilst maintaining substantial binocularity or zone congruence in the lower and intermediate viewing zones.

5. A lens element according to claim 4, wherein the lens element surface is designed as follows
    an approximately S-shaped cubic spline function is fitted to describe the full range of intermediate object distances between the fitting cross (FC) and the near vision reference point (NRP);
    a second approximately S-shaped cubic spline function is fitted to describe the variation of the lens optical vergence addition power such that it does not exceed the wearer's depth of focus value at the FC and provides the required nominal designated surface addition power at the NRP;
    a line is calculated on the lens front surface corresponding to the visual fixation locus utilising ray tracing techniques; and
    surface characteristics are optimised over the specified area to reduce or minimise the surface integral of the weighted RMS power error.

6. A lens element according to claim 1, wherein the lens element surface is designed to reduce swim within the peripheral region, such that the deviation from a preselected value of sagittal addition power, or the rate of change of the circumferential component of the ray traced lens prism, is reduced or minimised.

7. A lens element according to claim 6, wherein the preselected value of sagittal addition power is approximately equal to half the nominal addition power in the lower viewing zone.

8. A lens element according to claim 6, wherein the lens element surface is designed in addition to reduce or minimise the value of surface astigmatism, within the peripheral region.

9. A lens element according to claim 8, wherein the lens element surface is designed to minimise a weighted sum of surface astigmatism and sagittal addition power variation or the rate of change of the circumferential component of ray traced lens prism.

10. A lens element according to claim 9, wherein the maximum value of sagittal addition power in two sectors extending out to approximately 30 mm radius from the fitting cross (FC) and spanning a 60° angle centred on the horizontal line passing through the FC is no more than two thirds of the maximum sagittal addition power in the lower viewing zone.

11. A lens element according to claim 1, wherein the progressive lens element surface exhibits a modified distribution of surface astigmatism in the peripheral region.

12. A lens element according to claim 11, wherein the maximum level of peripheral surface astigmatism is maintained at a relatively low level within an approximate 30 mm radius of the fitting cross (FC) of the progressive lens element.

13. A lens element according to claim 12, wherein the maximum level of peripheral surface astigmatism is no greater than the nominal addition power of the progressive lens element within the 30 mm radius around the fitting cross.

14. A lens element according to claim 11, wherein the distribution of surface astigmatism in the peripheral region adjacent to the upper viewing zone exhibits a low gradient relative to the gradient proximate the lower viewing zone.

15. A series of progressive ophthalmic lens elements, each lens element including a lens surface having
   an upper viewing zone having a surface power to achieve a refracting power corresponding to distance vision;
   a lower viewing zone having a different surface power than the upper viewing zone to achieve a refracting power corresponding to near vision; and
   an intermediate zone extending across each lens element having a surface power varying from that of the upper viewing zone to that of the lower viewing zone;
   the progressive ophthalmic lens series including
   a first set of lens elements having a base curve(s) suitable for use in providing a range of distance prescriptions for a first specified category of patient, each lens element within a set differing in prescribed addition power and including a progressive design, such that
   one or more of the upper, intermediate and lower viewing zones of each lens element is designed optically to reduce or minimise a selected measure of blur for the corresponding range of object distances, and wherein the selected measure of blur is the RMS power error, the surface integral of the weighted RMS power error being minimised over an area limited by a prescribed variable distance from the visual fixation locus in one or more of the upper, intermediate and lower viewing zones;
   at least a portion of the peripheral region of each lens element surface being designed to reduce or minimise one or more surface characteristics known to correlate with the sensation of swim.

16. A lens element series according to claim 15, wherein the visual fixation locus from which the RMS power error contours are measured is an average fixation locus utilising a popular average interpupillary distance and an average reading distance for a number of patients requiring a designated addition power.

17. A lens element series according to claim 15, wherein the weighted RMS power error is minimised in the upper and lower viewing zones.

18. A lens element series according to claim 15, wherein each lens element surface is designed to reduce blur whilst maintaining substantial binocularity or zone congruence in the lower and intermediate viewing zones.

19. A lens element series according to claim 18, wherein each lens element surface is designed as follows
   an approximately S-shaped cubic spline function is fitted to describe the full range of intermediate object distances between the fitting cross (FC) and the near vision reference point (NRP);
   a second approximately S-shaped cubic spine function is fitted to describe the variation of the lens optical vergence addition power such that it does not exceed the wearer's depth of focus value at the FC and provides the required nominal designated surface addition power at the NRP;
   a line is calculated on the lens front surface corresponding to the visual fixation locus utilising ray tracing techniques; and
   surface characteristics are optimised over the specified area to reduce or minimise the surface integral of the weighted RMS power error.

20. A lens element series according to claim 15, wherein each lens element surface is designed to reduce swim within the peripheral region such that the deviation from a preselected value of sagittal addition power, or the rate of change of the circumferential component of the ray traced lens prism, is reduced or minimised.

21. A lens element series according to claim 20, wherein the preselected value of sagittal addition power is approximately equal to half the nominal addition power in the lower viewing zone.

22. A lens element series according to claim 20, wherein each lens element surface is designed in addition to reduce or minimise the value of surface astigmatism, within the peripheral region.

23. A lens element series according to claim 22, wherein each lens element surface is designed to minimise a weighted sum of surface astigmatism and sagittal addition power variation or the rate of change of the circumferential component of ray traced lens prism.

24. A lens element series according to claim 23, wherein the maximum value of sagittal addition power in two sectors extending out to approximately 30 mm radius from the fitting cross (FC) and spanning a 60° angle centred on the horizontal line passing through the FC is no more than two thirds of the maximum sagittal addition power in the near viewing zone.

25. A lens element series according to claim 15, wherein each lens element surface exhibits a modified distribution of surface power and/or surface astigmatism in the peripheral region.

26. A lens element series according to claim 25, wherein the maximum level of peripheral surface astigmatism is maintained at a relatively low level within an approximate 30 mm radius of the fitting cross (FC) of each lens element.

27. A lens element series according to claim wherein 15, the first category of patients are emmetropic patients.

28. A lens element series according to claim 27, wherein the design of the upper viewing zone and lower viewing zone is such as to provide substantially equal satisfaction for an average wearer at the designated addition power of each lens element; the respective sizes of the optical field of vision in the upper and lower viewing zones are selected to substantially balance optical performance for distance and near vision.

29. A lens element series according to claim 15, further including
  a second set of lens elements having a base curve(s) suitable for use in providing a range of distance prescriptions for a second category of patient;
  each lens element within a set differing in prescribed addition power and including a progressive design, such that
  one or more of the upper, intermediate and lower viewing zones of each lens element is designed optically to minimise a selected measure of blur for the corresponding range of object distances; and
  at least a portion of the peripheral region of each lens element surface being designed to minimise one or more surface characteristics known to correlate with the sensation of swim;
  the surface characteristics of the lens elements in the first set in the zone(s) optimised to minimise blur differing substantively in progressive design from the corresponding lens elements in the second set due to the differences in optical requirements of the Rx range intended for this/these base curve(s).

30. A lens element series according to claim 29, wherein the first category of patients are emmetropic patients and the second category of patients are myopic patients.

31. A lens element series according to claim 29, further including
  a third set of lens elements having a base curve(s) suitable for use in providing a range of distance prescriptions for a third category of patient;
  each lens element within the third set differing in prescribed addition power and including a progressive design, such that
  one or more of the upper, intermediate and lower viewing zones of each lens element is designed optically to minimise a selected measure of blur for the corresponding range of object distances; and
  at least a portion of the peripheral region of each lens element surface being designed to minimise one or more surface characteristics known to correlate with the sensation of swim;
  the surface characteristics of the lens elements in the third set in the zones optimised to minimise blur differing substantively in progressive design from the corresponding lens elements at the same addition power in the first and second sets due to the differences in optical requirements of the Rx range intended for this/these base curve(s).

32. A lens element series according to claim 31, wherein the third category of patients are hyperopic patients.

33. A lens element series according to claim 31, wherein the size of the optical field of clear vision in the lower viewing zone is maintained substantially constant for an object spaced a pre-selected distance from the Wearer's eye, independent of base curve; the optical field of clear vision being measured as an area limited by the RMS power error contour corresponding to approximately 0.75 D.

34. A lens element series according to claim 15, and including lens elements having at least 4 base curves with lens elements having 9 to 12 addition powers in 0.25 D increments.

35. A lens element series according to claim 15, each lens element within a set:
  having a low addition power, exhibits a relatively shallow power progression profile just below the fitting cross (FC); and
  having a high addition power exhibits a relatively steep power progression just below the FC and a rolling off of surface power below the near reference point (NRP).

36. A progressive ophthalmic lens element including a lens surface having
  an upper viewing zone having a surface power to achieve a refracting power corresponding to distance vision,
  a lower viewing zone having a different surface power than the upper viewing zone to achieve a refracting power corresponding to near vision, and
  an intermediate zone extending across the lens element having a surface power varying from that of the upper viewing zone to that of the lower viewing zone;
  one or more of the upper, intermediate and lower viewing zones being designed optically to reduce or minimise a selected measure of blur for the corresponding range of object distances, and wherein the selected measure of blur is the RMS power error, the surface integral of the weighted RMS power error being minimised over an area limited by a prescribed variable distance from the visual fixation locus in one or more of the upper, intermediate and lower viewing zones;
  at least a portion of the peripheral region of the surface of the lens element being designed to reduce or minimise one or more surface characteristics known to correlate with the sensation of swim; and
  the degree of zone congruence of the lens element in the intermediate zone is increased, and consequently in the lower viewing zone is slightly decreased.

37. A lens element according to claim 36, wherein the degree of zone congruence is consequently decreased slightly in the lower viewing zone at the tip of the contours associated with troublesome blur.

38. A method of designing a progressive ophthalmic lens element including a first lens surface having
  an upper viewing zone having a surface power corresponding to distance vision, a lower viewing zone having a different surface power than the upper viewing zone to achieve a refracting power corresponding to near vision, and
  an intermediate zone extending across the lens element having a surface power varying from that of the upper viewing zone to that of the lower viewing zone;
  one or more of the upper, intermediate and lower viewing zones of each lens element is designed optically to minimise a selected measure of blur for the corresponding range of object distances; and
  at least a portion of the peripheral region of each lens element surface being designed to minimise one or more surface characteristics known to correlate with the sensation of swim;
  which method includes
  selecting a base surface function for the lens surface
  wherein, for a symmetrical design, the base surface function is a Taylor expansion
  as follows:

$$z(x, y) = z_0(y) + \frac{h(y)}{2}x^2 + \frac{x^4}{12}[g_0(y) + g_2(y)x^2 + \cdots]$$

wherein
the functions $z_0(y)$ and $h(y)$ are determined by the desired eye path power progression profile $p(y)$
the functions $g_i(y)$ tare free coefficients; and
for an asymmetric design, the x-coordinate is substituted by the transformed equivalent $\zeta=x-u(y)$
wherein the function $u(y)$ describes the variation of the inset along the eye path; and
odd powers of $\zeta$ are added in the Taylor expansion;
selecting a first merit function to minimise the weighted ray traced RMS power error within the optical zones;
computing the coefficients $g_i(y)$ of the surface function that minimise the first merit function within the upper and lower viewing zones of the ophthalmic lens element;
separately selecting a second merit function to minimise one of more surface characteristics known to correlate with the sensation of swim, within at least the peripheral region;
computing the coefficients of the surface function that minimise the second merit function within the peripheral region of the ophthalmic lens element; and
fabricating an ophthalmic lens element having a lens surface shaped according to said modified surface function.

39. A method according to claim 38, wherein the second merit function is set to minimise the deviation from a preselected value of sagittal addition power or the rate of change of the circumferential component of the ray traced lens prism, within the peripheral region.

40. A method according to claim 38, wherein the second merit function is set to minimise in addition the value of surface astigmatism within the peripheral region.

41. A method according to claim 38, wherein the second merit function is a compound merit function M as follows:

$$M = M_F + M_P,$$

where $$M_F = W_F \int_{R_F} \varepsilon_{RMS}^2(\zeta, y) d\zeta dy \text{ and}$$

$$M_P = \int_{R_P} \{W_1 \Delta^2(\zeta, y) + W_2[K_{\theta\theta}(\zeta, y) - P_\theta]^2\} d\zeta dy.$$

wherein
$\varepsilon_{RMS}$ is the ray traced (RMS) power error of the surface, relative to a specified starting surface;
$\Delta$ is the surface astigmatism;
$K_{\theta\theta}$ is the sagittal curvature;
$P_\theta$ is a specified target sagittal curvature;
$W_F$, $W_1$, $W_2$ are appropriately selected weights,
$R_F$ is the portion of the lens which is intended primarily for "foveal" vision, and
$R_P$ is the portion of the lens that is intended for peripheral vision only.

* * * * *